(12) United States Patent
Eden

(10) Patent No.: US 10,965,887 B2
(45) Date of Patent: Mar. 30, 2021

(54) METHODS AND SYSTEMS FOR IMAGE LAYER SEPARATION

(71) Applicant: Nir Eden, Kfar-Saba (IL)

(72) Inventor: Nir Eden, Kfar-Saba (IL)

( * ) Notice: Subject to any disclaimer, the term of this patent is extended or adjusted under 35 U.S.C. 154(b) by 0 days.

(21) Appl. No.: 16/467,063

(22) PCT Filed: Dec. 7, 2017

(86) PCT No.: PCT/IB2017/057727
§ 371 (c)(1),
(2) Date: Jun. 6, 2019

(87) PCT Pub. No.: WO2018/104904
PCT Pub. Date: Jun. 14, 2018

(65) Prior Publication Data
US 2020/0077034 A1    Mar. 5, 2020

Related U.S. Application Data (60) Provisional application No. 62/431,551, filed on Dec. 8, 2016.

(51) Int. Cl.
*H04N 5/272*    (2006.01)
*H04N 5/232*    (2006.01)
*H04N 9/75*    (2006.01)

(52) U.S. Cl.
CPC .......... *H04N 5/272* (2013.01); *H04N 5/23229* (2013.01); *H04N 5/23267* (2013.01); *H04N 9/75* (2013.01)

(58) Field of Classification Search
CPC ............... H04N 5/272; H04N 5/23229; H04N 5/23267; H04N 9/75
See application file for complete search history.

(56) References Cited

U.S. PATENT DOCUMENTS

| | | | |
|---|---|---|---|
| 6,271,890 B1 | 8/2001 | Tamir et al. | |
| 6,304,298 B1* | 10/2001 | Steinberg | H04N 9/75 348/587 |
| 2008/0226273 A1 | 9/2008 | Kaku | |
| 2010/0111370 A1* | 5/2010 | Black | G06K 9/00369 382/111 |

FOREIGN PATENT DOCUMENTS

WO    WO 2018/104904    6/2018

OTHER PUBLICATIONS

International Preliminary Report on Patentability dated Jun. 20, 2019 From the International Bureau of WIPO Re. Application No. PCT/IB2017/057727. (6 Pages).
International Search Report and the Written Opinion dated Mar. 29, 2018 From the International Searching Authority Re. Application No. PCT/IB2017/057727. (9 Pages).

* cited by examiner

*Primary Examiner* — Michael E Teitelbaum (57) ABSTRACT

A method for separating layers in an image using image processing, comprising: identifying a non-repeating pattern depicted in a captured image, the non-repeating pattern comprising a plurality of graphic elements, having a different chroma and luma; defining a transformation between an original version of the non-repeating pattern stored in a memory and the non-repeating pattern depicted in the captured image; and removing the non-repeating pattern from the captured image by using the transformation, to be replaced by a target image.

21 Claims, 6 Drawing Sheets

METHODS AND SYSTEMS FOR IMAGE LAYER SEPARATION

RELATED APPLICATIONS

This application is a National Phase of PCT Patent Application No. PCT/IB2017/057727 having International filing date of Dec. 7, 2017, which claims the benefit of priority under 35 USC § 119(e) of U.S. Provisional Patent Application No. 62/431,551 filed on Dec. 8, 2016. The contents of the above applications are all incorporated by reference as if fully set forth herein in their entirety.

FIELD AND BACKGROUND OF THE INVENTION

The present invention, in some embodiments thereof, relates to layer separation in image and video editing and, more particularly, but not exclusively, to a colorful pseudo-random pattern used for keying.

Visual effects, commonly used in the film industry, for movies, television, promotional films and any other motion videos and photographing, enable an actor to appear in scenes which would otherwise be impossible, extremely difficult or very costly to obtain. The process includes several steps:

a) Keying: commonly referred to as a "blue screen", "green screen" and "chroma keying". This is a technique whereby actors and objects are filmed acting a scene in front of a monochromatic background. Then a process is performed in which the foreground scene is extracted, by eliminating objects that have similar colors the monochromatic color used as background.

b) Finding camera parameters: When three-dimensional rendering is desired, the camera location and the camera field of view, as well as other camera's related parameters are often required. Camera positioning relative to the scene, as well as other camera parameters are extracted in order to render the scene from the correct point of view of the camera.

c) Replacing the background or another layer: Computer-generated imagery (CGI) or scenes filmed elsewhere are used to replace the background marked by the keying process.

The same process may be applied to picture photography in order to replace the image background or to place an object in a picture.

Current three-dimensional camera positioning techniques require one or more of the following: an array of sensors fixed in the studio and camera fixture; lens and camera calibration; markers embedded in the chromatic background. Those are stationary and need to be placed in the studio or at the film location.

SUMMARY OF THE INVENTION

According to some embodiments of the present invention, there is provided a method for separating layers in an image using image processing and a surface having a non-repeating pattern printed, embedded or projected thereon. The method comprises identifying a non-repeating pattern covering a patterned surface, the non-repeating pattern depicted in a captured image, the non-repeating pattern comprising a plurality of graphic elements, having a different chroma and luma, defining a transformation between an original version of the non-repeating pattern stored in a memory and the non-repeating pattern depicted in the captured image, and removing the non-repeating pattern from the captured image by using the transformation, to be replaced by a target image.

Optionally, the plurality of graphic elements have multiple colors and are patterned such that none of the multiple colors covers more than 40% of the patterned surface.

Optionally, the plurality of graphic elements having a unique arrangement in each area of the non-repeating pattern.

More optionally, at least some of the plurality of graphic elements have different distance from each other of the plurality of graphic elements.

More optionally, the unique arrangement includes at least one of random and pseudorandom arrangement.

Optionally, an entropy representing the number of colors and shades of the non-repeating pattern is larger than 7.

Optionally, autocorrelation of the non-repeating pattern has a sharp main peak.

More optionally, autocorrelation coefficients of off-peak areas of the non-repeating pattern are smaller than 30% of the autocorrelation coefficients of the sharp main peak.

More optionally, the sharp main peak is identified when part of the non-repeating pattern is not visible.

More optionally, the sharp main peak is identified when 70% of the non-repeating pattern is not visible.

More optionally, the sharp main peak is identified when the non-repeating pattern is blurred.

Optionally, colors of the non-repeating pattern are balanced.

Optionally, the non-repeating pattern is created by:
generating two or more monochromatic patterns, and
using each of the monochromatic patterns as color channels of the non-repeating pattern. The color channels can visible to the human eyes or invisible.

More optionally, the monochromatic patterns are created by at least one of pseudorandom code and heat diffusion algorithm.

Optionally, the non-repeating pattern is created by randomly or pseudo-randomly adding elements onto a two dimensional image.

More optionally, the elements include at least one of Barker coded elements, two dimensional matrix barcodes and dense colored symbols.

Optionally, the non-repeating pattern is created by:
representing each pixel of a two dimensional matrix by base-3 numbers, and
using three colors to represent each pixel number created.

Optionally, the non-repeating pattern is created by:
randomly selecting a color for pixels of a two dimensional matrix, and
applying turbulence algorithm on the two dimensional matrix More optionally, the method further comprises, first:
generating the non-repeating pattern, and
storing the non-repeating pattern in the memory.

More optionally, the method further comprises capturing the captured image by a camera, the captured image depicting an object and the non-repeating pattern.

Optionally, the captured image depicting a plurality of non-repeating patterns.

More optionally, the method further comprises calculating position of a camera capturing the captured image relative to a printed the non-repeating pattern, based on the transformation, and using the position to render the target image.

More optionally, the method further comprises identifying color changes between the original version of the non-repeating pattern and the non-repeating pattern depicted in the captured image, and applying the changes to the target image.

More optionally, the method further comprises determining parameters of a camera depicting the captured image based on a plurality of images depicting the non-repeating pattern.

Optionally, the plurality of images are taken at different angles and distances of a printed the non-repeating pattern.

Optionally, the plurality of images are frames of a captured scene.

Optionally, the plurality of images are each depicting a plurality of printed non-repeating patterns physically placed at different planes.

Optionally, the non-repeating patterns is printed on a non-flat surface.

According to some embodiments of the present invention, there is provided a software program product for separating layers in an image using image processing, comprising: a non-transitory computer readable storage medium, a memory for storing a non-repeating pattern, the non-repeating pattern comprising a plurality of graphic elements, each having a different chrome and luma, first program instructions for identifying the non-repeating pattern depicted in a captured image, second program instructions for defining a transformation between an original version of the non-repeating pattern stored in a memory and the non-repeating pattern depicted in the captured image, and third program instructions for removing the non-repeating pattern from the captured image by using the transformation, to be replaced by a target image. The first, second and third program instructions are executed by at least one computerized processor from the non-transitory computer readable storage medium.

According to some embodiments of the present invention, there is provided a system for separating layers in an image using image processing. The system comprises a camera for capturing a captured image depicting a non-repeating pattern, the non-repeating pattern comprising a plurality of graphic elements, each having a different chroma and luma, and a processor for executing instructions to: identify the non-repeating pattern depicted in the captured image defining a transformation between an original version of the non-repeating pattern stored in a memory and the non-repeating pattern depicted in the captured image, and removing the non-repeating pattern from the captured image by using the transformation, to be replaced by a target image.

According to some embodiments of the present invention, there is provided a kit for separating layers in an image using image processing, comprising: a surface having a non-repeating pattern printed or embedded thereon, the non-repeating pattern comprising a plurality of graphic elements, having a different chroma and luma, and a computer readable medium comprising computer executable instructions adapted to: identify the non-repeating pattern depicted in a captured image, define a transformation between an original version of the non-repeating pattern stored in a memory and the non-repeating pattern depicted in the captured image, and remove the non-repeating pattern from the captured image by using the transformation, to be replaced by a target image.

Optionally, the non-repeating pattern is projected on a surface and have temporal changes.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to layer separation in image and video editing and, more particularly, but not exclusively, to a colorful pseudo-random pattern used for keying. The colorful pseudorandom pattern is suggested for replacing the monochromatic screen.

According to some embodiments of the present invention, there are provided methods and systems for keying based on a unique non-repeating pattern. The proposed design is a pattern that includes multiple graphic elements which are arranged differently in each area of the non-repeating pattern, and is optionally multi-colored. This means that each part of the pattern may be uniquely identified. By analyzing one image (or a sequence of frames) depicting the non-repeating pattern, for example when it is used a background in a filmed scene, it is possible to identify the non-repeating pattern, define a transformation of its currently depicted version from the original version, and remove it from the image, so it may be replaced by a target image. It is also possible to find the position of the camera relative to the depicted non-repeating pattern using multiple images of the non-repeating pattern, so no special calibration equipment is needed.

In current methods of using a single color chroma screen, filmed scene lighting must be balanced and even, as changes in illumination levels, such as shadows or folds in the chroma screen, may result in unwanted effects in the background. Also, the reflected light from the chroma screen illuminates the objects in the scene with the same color as the chroma screen. This reflection is uneven since the light reflected from the background is related to an object's location, the camera location, and the object's shape, color, and its surface shine and glow. Another problem exists, when an object that has the same color as the chroma screen is in the image, the part of the object it might be keyed as well. This happens since the keying process uses color data to separate the foreground from the background.

The suggested non-repeating pattern overcomes the disadvantages of monochromatic keying. Such a unique and color balanced pattern may not paint the object of the scene in one color. The cases in which the same color appears on both the object and the pattern may be very limited and small in scale. This means that the foreground scene, for example, may be easily separated from the background. Also, not only is the suggested non-repeating pattern not sensitive to shadows and changes in illumination levels, but such changes (and others) may be identified and then applied to the target image, to make a more realistic final image and/or used for rendering visual effects.

Another advantage is the use of the non-repeating pattern for camera calibration, requiring multiple images depicting the non-repeating pattern in order to identify camera parameters, but no other special equipment.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
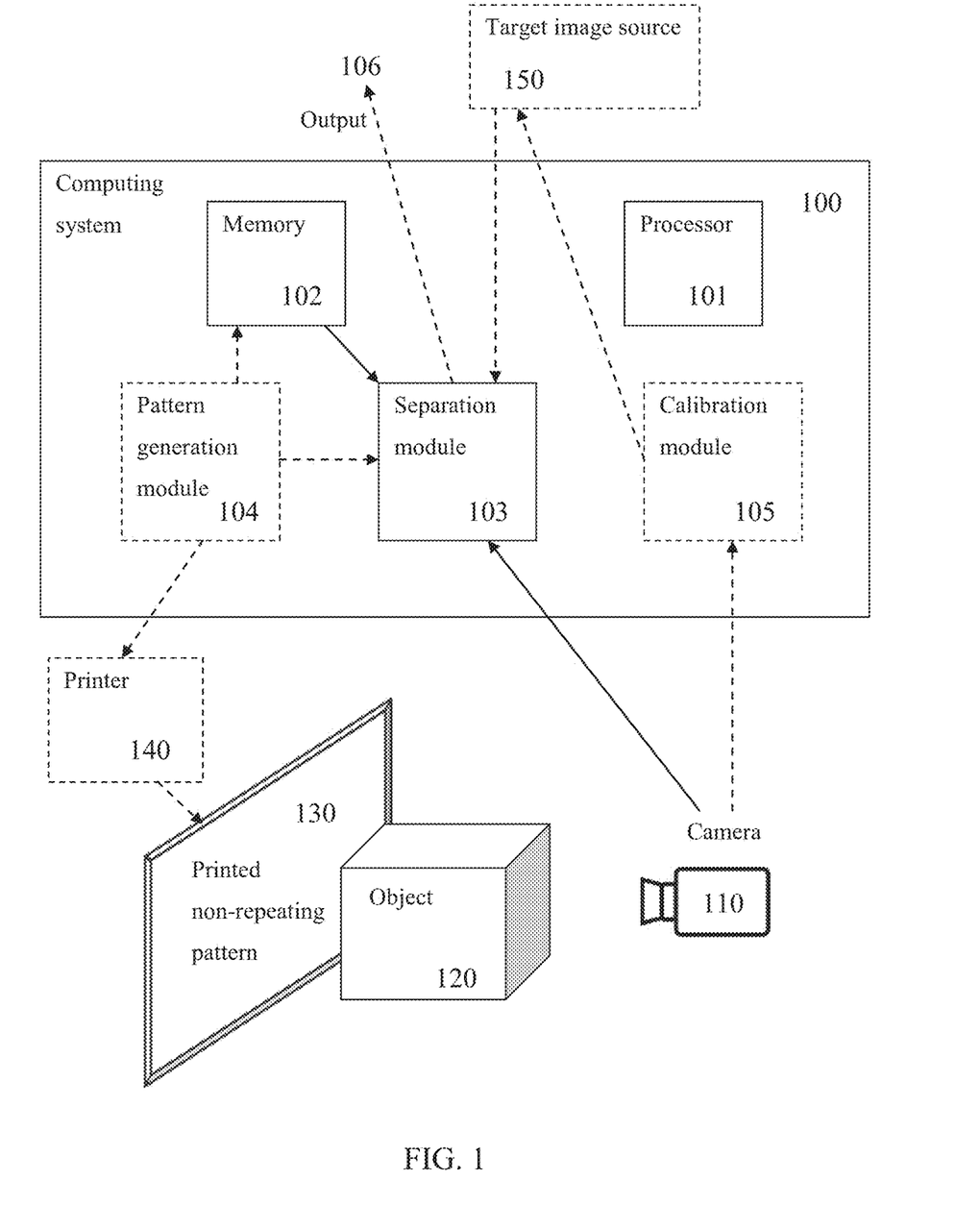
FIG. 1 is a schematic illustration of a system for separating foreground, background and/or other layers from an object in an image using image processing, according to some embodiments of the present invention.

Referring now to the drawings, FIG. 1 is a schematic illustration of a system for separating foreground, background and/or other layers from an object in an image using image processing, according to some embodiments of the present invention.

A computing system 100 includes a processor 101, a memory 102 storing the non-repeating pattern and modules for image processing. When an image is captured by a camera 110, of an object 120 and a printed non-repeating pattern 130, the non-repeating pattern is eliminated from the captured image by a separation module 103. The printed non-repeating pattern may be generated by a pattern generation module 104, and printed by a printer 140. The parameters of the camera relative to the printed non-repeating pattern may be determined by a calibration module 105. The non-repeating pattern is printed or projected on a surface referred to herein a patterned surface.

Computing system 100 may include one or more computing devices such as a mainframe computer, an enterprise server, a workstation, multiple connected computers, one or more virtual machines and/or a personal computer. Computing system 100 may also be, for example, processing node, computer, laptop, server, mobile device, wearable device such as 'smart-glasses' and/or any processing device. Computing system 100 may be connected to camera 110, have access to imaging data from such a device, and/or connected to a client device comprising camera 140, via a network. The network may include, for example, local area network (LAN), a wireless network such as mobile network, wireless local area network (WLAN) such as Wireless Fidelity (WiFi™), a wireless personal area network (WPAN) such as Bluetooth™ protocol, near-field communication (NFC) and/or any other network.

Processor 101 may execute software that includes instructions for performing a method according to some embodiments of the present invention. Processor 101 may include one or more processors arranged for parallel processing, such as clusters and/or as one or more multi core processor (s), neural network hardware, and/or any other processing hardware. Processor 101 may also include one or more of the modules for image processing, for example by including programmable or specific processing hardware such as field-programmable gate array (FPGA), system on chip (SOC) and/or application-specific integrated circuit (ASIC).

Memory 102 may include one or more non-transitory persistent storage devices, for example, a hard drive, a Flash array and/or the like. Memory 102 may further comprise one or more network storage devices, for example, a storage server, a network accessible storage (NAS), a network drive, and/or the like. Memory 102 may also include one or more volatile devices, for example, a Random Access Memory (RAM) component and/or the like. Memory 102 may store one or more software modules, for example, an OS, an application code, a tool, an agent, a service, a script and/or the like, each comprising a plurality of program instructions that may be executed by processor 101.

Figure 2:
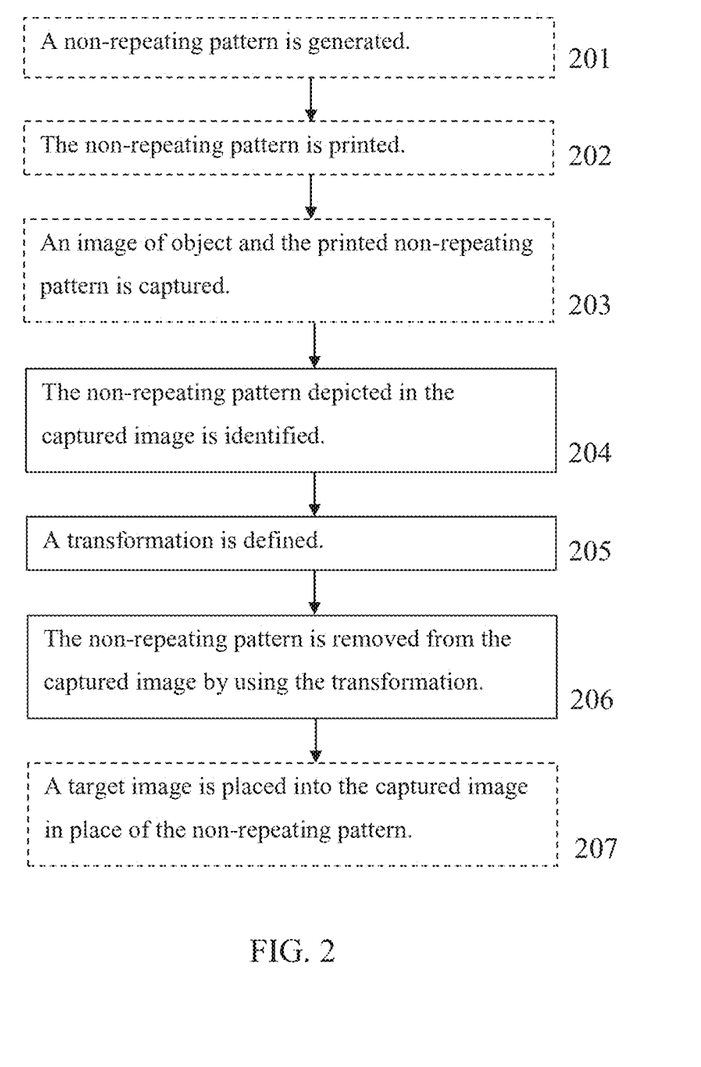
FIG. 2 is a flowchart schematically representing a method for separating foreground, background and/or other layers from an object in an image and/or video using image processing, according to some embodiments of the present invention.

Reference is also made to FIG. 2, which is a flowchart schematically representing a method for separating foreground, background and/or other layers from an object in an image and/or video using image processing, according to some embodiments of the present invention.

First, optionally, as shown at 201, a non-repeating pattern is generated and stored in memory 102. The non-repeating pattern includes multiple graphic elements. The graphic elements may include, for example, shapes, lines, dots, figures, letters, images, and/or any other graphic.

The non-repeating pattern is multi-chromatic, meaning that it is not monochromatic, and it includes multiple colors. The different colors of the non-repeating pattern allow better distinction from other depicted objects, prevents color changes by reflected light, and minimizes cases of erroneous removal of parts of other depicted objects.

Some of the graphic elements are of different Chrominance (chroma) and/or luma than other of the graphic elements. Chroma is the colorfulness relative to the brightness of a similarly illuminated area that appears to be white or highly transmitting. Luma represents the brightness (the "grayscale" portion of the pattern). Luma component represents the achromatic pattern, while the chroma components represent the color information.

Entropy of the non-repeating pattern may be defined by the amount of different colors and shades in the non-repeating pattern: $E=\Sigma_p-p_i \log_2(p_i)$, where p contains the normalized histogram counts. For example, for RGB image, p(0,0,0) contains the number of pixels with value of (R=0, G=0, B=0)/total number of pixels. It is then required that the entropy is larger than a defined number, for example larger than 7, meaning it is required that there are at least 128 different colors and shades in the pattern.

The non-repeating pattern includes multiple graphic elements that have a unique arrangement in each area of the non-repeating pattern. The unique arrangements mean that each part of the pattern is different, and so it may be uniquely identified by an image processing algorithm. An area of the non-repeating pattern may be any sub-part of the non-repeating pattern, and may include a certain percentage of the non-repeating pattern. An area may be defined, for example, on the top, side, bottom, middle and/or any section of the non-repeating pattern.

The arrangement of the graphic elements may include random arrangement, may include pseudorandom arrangement, meaning that it exhibits statistical randomness while being generated by a deterministic causal process, and/or any other arrangement that is different for each part of the pattern.

The graphic elements may be placed in the non-repeating pattern so that at least some of them have different distances from the other graphic elements. This creates a non-ordered arrangement of the graphic elements.

The non-repeating pattern may be generated by a pattern generation module 104, executed by processor 101. Alternatively, the non-repeating pattern is previously generated by a separate system, for example, one or more non-repeating patterns are provided with software that is installed on computing system 100. Optionally, a different and distinct non-repeating pattern(s) is provided to each client of the software, so each non-repeating pattern is uniquely assigned for each user to control license distribution.

Optionally, the non-repeating pattern has autocorrelation with a sharp, single main peak that may be identified. The main peak is the area where the autocorrelation has the biggest value, and autocorrelation coefficients that are larger than a specific value are considered within the peak. For example, the off-peak (non-cyclic) autocorrelation coefficients are smaller than 30% of the autocorrelation coefficients of the main peak. The auto-correlation of an M by N matrix may be defined by a two dimensional matrix X, its elements are given by: $r(i,j)=\Sigma_{m=1}^{M}\Sigma_{n=1}^{N}X(m,n)X(m-i,n-j)$. It is then required that: $0.3 \cdot |r(0,0)| \geq |r(i,j)|$ for all $\|i,j\| > a$, where a is the main peak size.

Optionally, the main peak of the autocorrelation may be identified when part of the non-repeating pattern is not visible. For example, the main peak may be identified when 70%, 80%, 90% and/or any other smaller, intermediate or larger percentage of the pattern is not visible. This is important so that the non-repeating pattern may be identified in the source image even when most of it is covered by object(s).

Optionally, the main peak of the autocorrelation may be identified when the non-repeating pattern is blurred, for example when an image depicting the non-repeating pattern is out of focus or has a motion blur. To simulate such blur conditions by image processing, it is possible for example to use a filter with a disk-shaped kernel with a size of 1% of the background image diagonal.

Optionally, there is no dominating color in the non-repeating pattern when all the shades of a certain color are considered as the certain color (e.g. pixels of light green, dark green, and mild green are all pixels of the same color). As used herein, a dominating color is a color covering at least 40%, for example at least 45%, at least 50% or at least 60% of the patterned surface which may be made of paper, cardboard, sticker, fabric, metal and/or any other material. As used herein a color is a spectral color which is distinct from another color to a person, for example a color selected from the following main bands red, orange, yellow, green, blue (or cyan and indigo), and violet. Multiple colors are not multiple tones or shades of the same color but rather color which are semantically distinct for a viewing person.

Unlike a chromakeying screen such as a green screen that is based on a surface containing one dominating color, the non-repeating pattern includes more than just green or blue while none of the colors of the non-repeating pattern covers more than 65%, 60%, 50% or 45% of the total patterned surface or total number of pixels.

Optionally, the colors of the non-repeating pattern are balanced. Since the information of the image is in both the intensity channel and the chroma channel, a shadow or unequal lighting may compromise the image of the object. This property prevents change in the color of depicted objects due to reflected light from the pattern, and colors of the acquired image remain balanced. When the overall intensity of a color is given, for example in red, green and blue (RGB), by:

$reds=\Sigma_{all\ pixels}$(red value of each pixel);

$greens=\Sigma_{all\ pixels}$(green value of each pixel); and $blues=\Sigma_{all\ pixels}$(blue value of each pixel);

then the requirement for no dominating color may be defined by:

$0.5 \cdot greens < reds < 1.5 \cdot greens;$ $0.5 \cdot blues < reds < 1.5 \cdot blues;$ and $0.5 \cdot greens < blues < 1.5 \cdot greens.$ Optionally, the non-repeating pattern is created by generating three monochromatic patterns, and using each of the monochromatic patterns as color channels of the non-repeating pattern. Three matrices may be created, each having the size of the desired non-repeating pattern matrix. For example, each of the monochromatic patterns is used for one of the red, green and blue of the RGB channels. The monochromatic patterns may include any pattern, and include any graphic element as described above. For example, a different page of text may be used for each monochromatic pattern.

Optionally, the monochromatic patterns are created by a pseudorandom code, which is used to fill the two dimensional matrices.

Optionally, the monochromatic patterns are created by a heat diffusion algorithm. For example, a matrix is randomly populated, and then heat diffusion algorithm is applied, for example an anisotropic diffusion, a non-linear anisotropic diffusion or any other related heat diffusion partial differential equation (PDE).

Optionally, the non-repeating pattern is created by randomly or pseudo-randomly adding elements onto a two dimensional image.

Figure 3A:
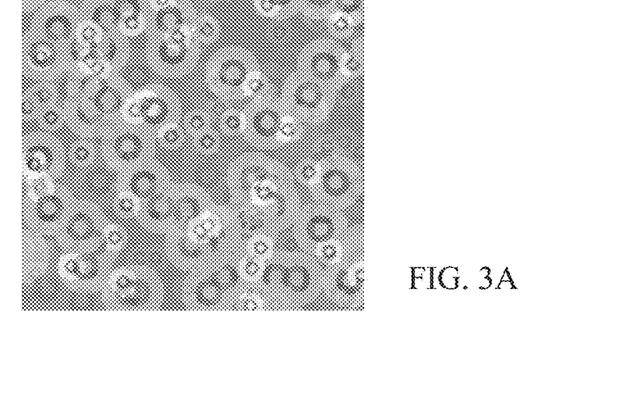
FIG. 3A is an exemplary non-repeating pattern created by randomly placing circular Barker code elements, according to some embodiments of the present invention.

Optionally, the elements placed on a two dimensional image are Barker code elements. Barker code elements may have shapes of lines, circles and/or any other geometrical shape. Reference is now made to FIG. 3A, which is an exemplary non-repeating pattern created by randomly placing circular Barker code elements, according to some embodiments of the present invention.

Optionally, the elements placed on a two dimensional image are two dimensional matrix barcodes, such as quick response (QR) codes. Multiple barcodes may be placed, having different colors, in order to minimize black spots. barcodes with different sizes may be used in order to fulfill requirements for autocorrelation under different conditions as described above. Optionally, the barcodes may overlap.

Figure 3B:
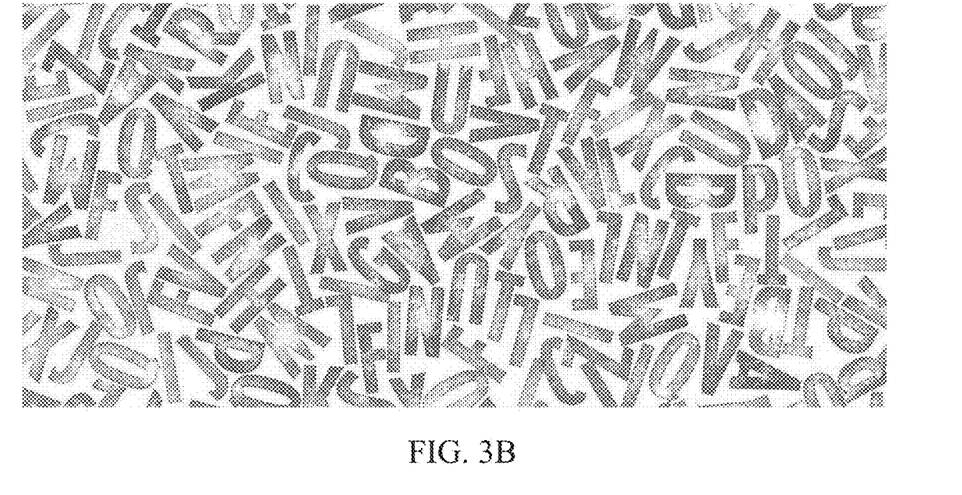
FIGS. 3B and 3C are exemplary non-repeating patterns created by randomly placing letters, according to some embodiments of the present invention.
Figure 3C:
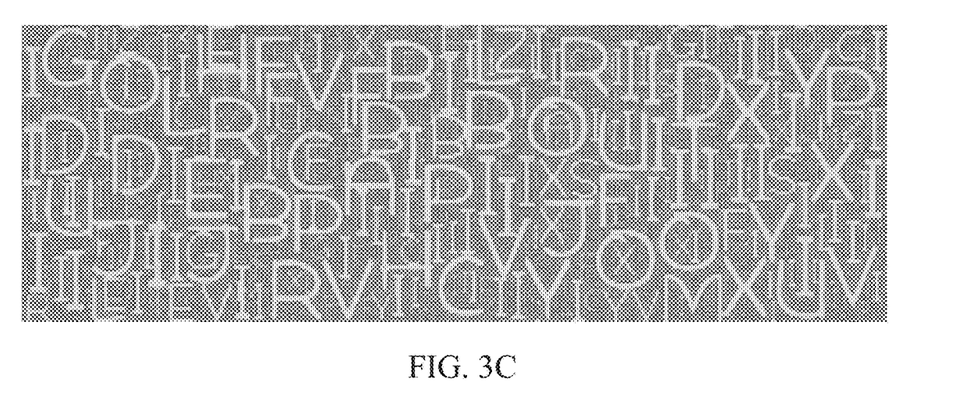

Optionally, the elements placed on a two dimensional image are random dense colored symbols, such as geometric shapes, letters, and numbers. Reference is now made to FIGS. 3B and 3C, which are exemplary non-repeating patterns created by randomly placing letters, according to some embodiments of the present invention.

Figure 3D:
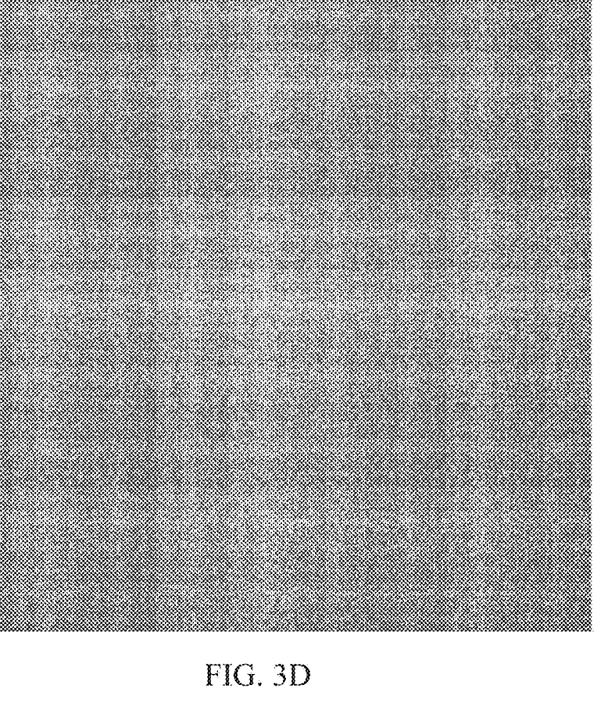
FIG. 3D is an exemplary non-repeating pattern created by representing pixels by base-3 numbers, each representing a color, according to some embodiments of the present invention.

Optionally, the non-repeating pattern is created by representing each pixel of a two dimensional matrix by base-3 numbers, and then using three colors, for example red, green and blue colors, to represent the pixel number created. Reference is now made to FIG. 3D, which is an exemplary non-repeating pattern created by representing pixels by base-3 numbers, each representing a color, according to some embodiments of the present invention.

Figure 3E:
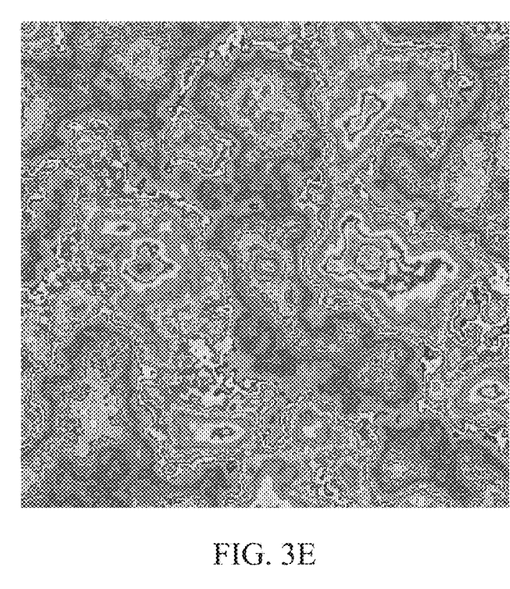
FIG. 3E is an exemplary non-repeating pattern created by turbulence algorithm, according to some embodiments of the present invention.

Optionally, the non-repeating pattern is created by randomly selecting a color for pixels of a two dimensional matrix, and then applying turbulence algorithm on the two dimensional matrix. Reference is now made to FIG. 3E, which is an exemplary non-repeating pattern created by turbulence algorithm, according to some embodiments of the present invention. The turbulence at a point is created by summing the noise at that point with scaled down noise values at other points.

Then, optionally, as shown at 202, the non-repeating pattern is printed, for example by printer 140. The non-repeating pattern may be printed on any patterned surface, for example paper, cardboard, sticker, fabric, metal and/or any other surface. The non-repeating pattern may be printed in any size and/or shape, according to the needs defined by the setting in which the image is captured. Printer 140 may be of any kind, for example an industrial printer, an office printer and/or any other color printer.

Alternatively, printed non-repeating pattern 130 is provided with computing system 100 or with software that is installed on computing system 100, for example as a kit. Printed non-repeating pattern 130 may be, for example, a screen made of fabric, a folding board and/or any other flat or three-dimensionally shaped object having the non-repeating pattern printed thereon.

Optionally or alternatively, the non-repeating pattern may be presented on a screen, for example a computer screen, a TV screen and/or any other image projection device. Optionally or alternatively, the non-repeating pattern may be projected, by a projector, on a surface. For example, a curtain, a wall or an object such as table, desk or counter.

Then, optionally, as shown at 203, an image is captured of object 120 and printed non-repeating pattern 130, optionally by camera 110. The captured image may be a single image or may be a frame in a video sequence. Multiple single images and/or videos may be captured with printed non-repeating pattern 130, to be processed for removing the non-repeating pattern.

Object 120 may include one or more objects of any size and/or shape, such as furniture, a statue, a building, a small item and/or any other object or a collection of objects, and may also include humans, such as actors in a film. Printed non-repeating pattern 130 may be placed behind object 120 to be used as the background of the filmed actors and objects, for example attached to or hung from a wall. Printed non-repeating pattern 130 may also be placed in front of object 120, between some of the objects and/or at any other location in the filmed scene. Optionally, multiple printed non-repeating patterns are depicted in the captured image, which may be of the same non-repeating pattern and/or different non-repeating patterns.

Camera 110 may include one or more light capturing sensors, for example, a single or dual sensor camera of a mobile client device, a webcam, a single-lens reflex camera (SLR), an action camera, a depth sensing camera, an omni-directional camera, camera included in a wearable device such as 'smart-glasses' and/or any type of digital camera.

Alternatively, the image may be captured by a separate system and/or camera and provided to computing system 100, for example when captured at a different location.

Then, as shown at 204, the non-repeating pattern depicted in the captured image is identified. This may be done by separation module 103, using image processing algorithms that search for the non-repeating pattern in the captured image. For example correlation function is used to compare the captured image with the non-repeating pattern in different sizes and rotations. For another example, neural networks are used to search for the non-repeating pattern. The size, location and shape of the pattern are then extracted.

Then, as shown at 205, a transformation is defined between the original version of the non-repeating pattern, as generated and stored in memory 102, and the identified non-repeating pattern as depicted in the captured image. This may be done by separation module 103.

For example, the non-repeating pattern may be of different size, may be shifted, rotated and/or skewed in the captured image. The transformation is a matrix defining, for each pixel in the original version of the non-repeating pattern, its new location in the non-repeating pattern as depicted in the captured image.

Then, as shown at 206, the non-repeating pattern is removed from the captured image by using the transformation. This may be done by separation module 103. For example, the transformation may be applied to the original version of the non-repeating pattern in order to create a version of the non-repeating pattern that is similar to the non-repeating pattern as depicted in the captured image. Then, this version of the non-repeating pattern may be subtracted from the captured image, so the non-repeating pattern is removed from the captured image. Optionally, an alpha key (or alpha channel) is generated based on the transformation, which defines transparent areas in the captured image, where the non-repeating pattern is depicted.

Finally, optionally, as shown at 207, a target image is placed into the captured image in place of the non-repeating pattern. The target image may be received from a target image source 150, which may be for example, a memory storing images, a computing module for creating images and/or any other source. The target image may be a single image or a respective frame of a target video sequence (when the captured image is a frame of a captured video). The target image may be another image captured for example at a different location and/or an image rendered by a CGI processor. This may be done by placing the target image layer behind the captured image layer. Optionally, the resulting output is a final image, which may be exported from computing system 100, as shown at 106.

Optionally, camera position relative to printed non-repeating pattern 130 is calculated based on the transformation. The three dimensional location and angular position of the camera may be extracted. This may be done by a calibration algorithm, for example Pose from Orthography and Scaling with Iterations (POSIT) algorithm. This may be done to provide the viewpoint of the camera as input for the CGI processor, so the rendered image matches the captured image.

Optionally, changes in color and/or shading are identified between the original version of the non-repeating pattern and the non-repeating pattern as depicted in the captured image, such as a shadow cast by object 120. These changes are applied as color correction to target image the get a more realistic result.

Optionally, when object 120 and printed non-repeating pattern 130 have the same color in a specific region of the captured image, this may result in unwanted region removed. An inpainting technique may be applied to that region to correct the problem.

Optionally, parameters of camera 140 are determined based on multiple images of printed non-repeating pattern 130. This process is referred to as camera calibration or camera resectioning. Unique characteristics of the camera and the lens may be evaluated, such as focal length, lens location relative to the image sensor and/or lens distortion. These camera parameters may be applied to a CGI processor to create a more realistic rendered scene. For example, the camera parameters may be sent to target image source 150, which generates the target image.

Any known camera calibration algorithm may be used. A camera calibration algorithm compares location data points corresponding to points in the physical world, to points in the captured image space. These points may be extracted from captured images and/or video of the non-repeating pattern, and used as input for the camera calibration algorithm. Capturing the images used for calibration may be done for example as part of a regular film shooting or as a dedicated calibration procedure.

Figure 4A:
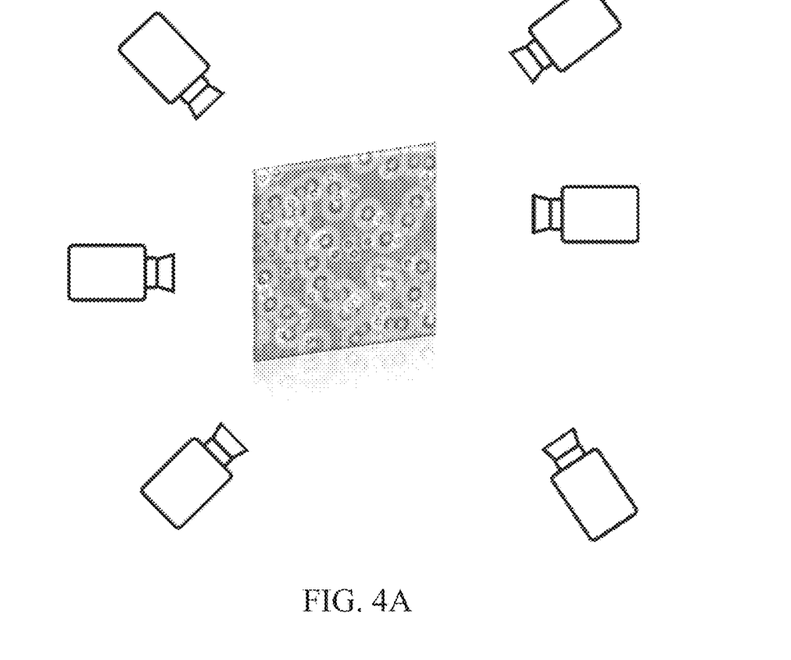
FIGS. 4A, 4B and 4C are exemplary setups for capturing images used for camera calibration, according to some embodiments of the present invention.
Figure 4B:
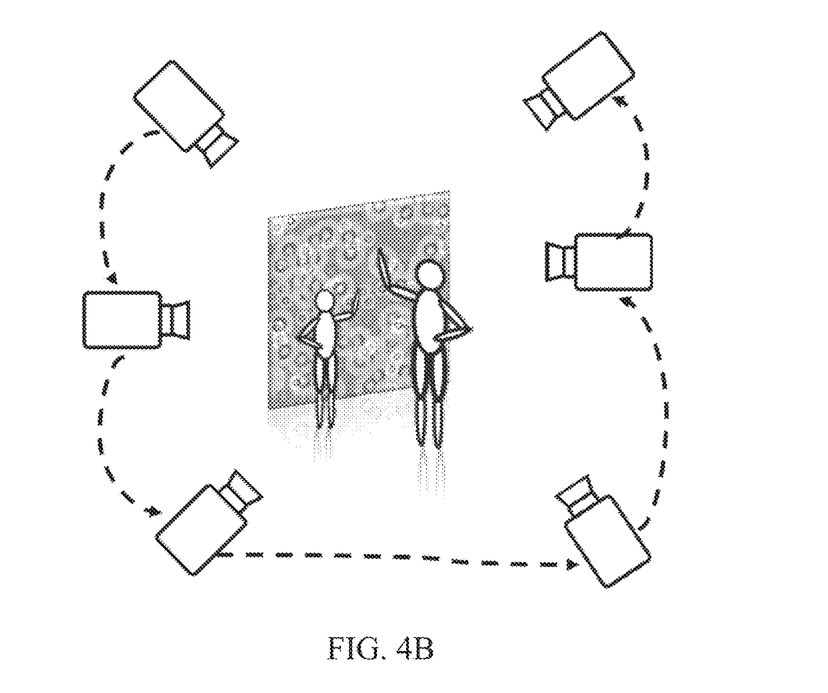
Figure 4C:
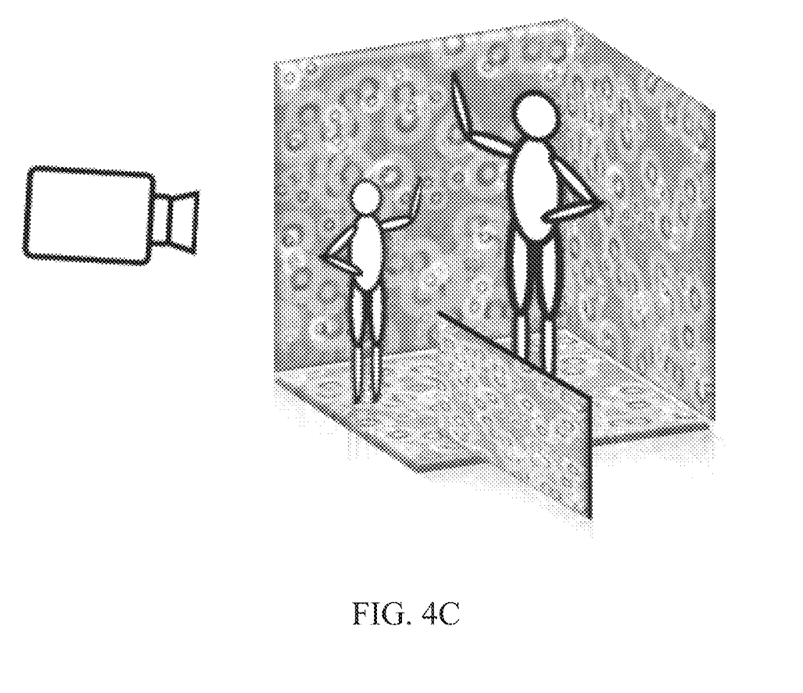

Reference is now made to FIGS. 4A, 4B and 4C, which are exemplary setups for capturing images used for camera calibration, according to some embodiments of the present invention.

Optionally, multiple calibration images of printed non-repeating pattern 130 are taken at different angels and/or distances, as shown at FIG. 4A. For each of these calibration images, points are extracted from the non-repeating pattern as depicted, that correspond to points on printed non-repeating pattern 130. These points are used as input for the camera calibration algorithm. This approach is suitable for a situation where the camera's parameters cannot be changed. An example for such a camera is cellphone camera. Most cellphone cameras have single, fixed, lens with one focal length.

Optionally, multiple frames of a captured scene are used for calibration, when camera 140 is changing both the angle relative to printed non-repeating pattern 130 and the distance from printed non-repeating pattern 130, but have a fixed focal length, as shown at FIG. 4B. It is then possible to extract from the captured frames both the physical world points and captured image space points. These sets of points may then be used as input for the camera calibration algorithm.

Optionally, multiple printed non-repeating patterns, physically placed at different planes, are depicted in a captured scene, as shown at FIG. 4C. In this case, input for the camera calibration algorithm may be extracted from frames even when parameters of camera 140, such as focal length, change during the capturing of the scene.

Optionally, printed non-repeating pattern 130 is a non-flat surface, and includes unleveled and/or irregular planes, for example protrusions in the shape of square pyramids on which the non-repeating pattern is printed on. In this case, no camera calibration is required. Each frame contains all that is needed data for keying, camera positioning and color matching.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant image processing algorithms and methods will be developed and the scope of the term image processing is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for separating layers in an image using image processing and a surface having a non-repeating pattern printed, embedded or projected thereon, comprising:
    identifying a non-repeating pattern covering a patterned surface, the non-repeating pattern depicted in a captured image, said non-repeating pattern comprising a plurality of graphic elements, having a different chroma and luma;
    defining a transformation between an original version of said non-repeating pattern stored in a memory and said non-repeating pattern depicted in said captured image; and
    removing said non-repeating pattern from said captured image by using said transformation, to be replaced by a target image;
    wherein the non-repeating pattern is a multi-chromatic pattern formed by the different chroma and luma of the plurality of graphic elements and is not required to contain vertices; and
    wherein colors appearing in said patterned surface are not required to be excluded from appearance in said target image.

2. The method of claim 1, wherein said plurality of graphic elements have multiple colors and are patterned such that none of the multiple colors covers more than 40% of the patterned surface.

3. The method of claim 1, wherein said plurality of graphic elements having a unique arrangement in each area of said non-repeating pattern.

4. The method of claim 3, wherein at least some of said plurality of graphic elements have different distance from each other of said plurality of graphic elements.

5. The method of claim 4, wherein said unique arrangement includes at least one of random and pseudorandom arrangement.

6. The method of claim 1, wherein an entropy representing the number of colors and shades of said non-repeating pattern is larger than 7.

7. The method of claim 1, wherein autocorrelation of said non-repeating pattern has a sharp main peak; wherein autocorrelation coefficients of off-peak areas of said non-repeating pattern are smaller than 30% of the autocorrelation coefficients of said sharp main peak.

8. The method of claim 7, wherein said sharp main peak is identified when 70% of said non-repeating pattern is not visible.

9. The method of claim 1, wherein said non-repeating pattern is created by:
    generating two or more monochromatic patterns; and
    using each of said monochromatic patterns as color channels of said non-repeating pattern, the color channels can visible to the human eyes or invisible.

10. The method of claim 1, wherein said non-repeating pattern is created by randomly or pseudo-randomly adding elements onto a two dimensional image.

11. The method of claim 10, wherein said elements include at least one of Barker coded elements, two dimensional matrix barcodes and dense colored symbols.

12. The method of claim 1, wherein said non-repeating pattern is created by at least one of:
    a) representing each pixel of a two dimensional matrix by base-3 numbers; and
    using three colors to represent each pixel number created;
    b) randomly selecting a color for pixels of a two dimensional matrix; and
    applying turbulence algorithm on the two dimensional matrices.

13. The method of claim 1, further comprising,
    capturing said captured image by a camera, said captured image depicting an object and said non-repeating pattern.

14. The method of claim 1, further comprising,
    calculating position of a camera capturing said captured image relative to a printed said non-repeating pattern, based on said transformation; and
    using said position to render said target image.

15. The method of claim 1, further comprising,
    identifying color changes between said original version of said non-repeating pattern and said non-repeating pattern depicted in said captured image; and
    applying said changes to said target image.

16. The method of claim 1, further comprising,
    determining parameters of a camera depicting said captured image based on a plurality of images depicting said non-repeating pattern;

wherein said plurality of images are frames of a captured scene taken at different angles and distances of a printed said non-repeating pattern.

17. A software program product for separating layers in an image using image processing, comprising:
a non-transitory computer readable storage medium;
a memory for storing a non-repeating pattern, said non-repeating pattern comprising a plurality of graphic elements, each having a different chrome and luma;
first program instructions for identifying said non-repeating pattern depicted in a captured image;
second program instructions for defining a transformation between an original version of said non-repeating pattern stored in a memory and said non-repeating pattern depicted in said captured image; and
third program instructions for removing said non-repeating pattern from said captured image by using said transformation, to be replaced by a target image;
wherein said first, second and third program instructions are executed by at least one computerized processor from said non-transitory computer readable storage medium;
wherein the non-repeating pattern is a multi-chromatic pattern formed by the different chroma and luma of the plurality of graphic elements and is not required to contain vertices; and
wherein colors appearing in said patterned surface are not required to be excluded from appearance in said target image.

18. A system for separating layers in an image using image processing, comprising:
a camera for capturing a captured image depicting a non-repeating pattern, said non-repeating pattern comprising a plurality of graphic elements, each having a different chrome and luma; and
a processor for executing instructions to:
identify said non-repeating pattern depicted in said captured image
defining a transformation between an original version of said non-repeating pattern stored in a memory and said non-repeating pattern depicted in said captured image; and
removing said non-repeating pattern from said captured image by using said transformation, to be replaced by a target image;
wherein the non-repeating pattern is a multi-chromatic pattern formed by the different chroma and luma of the plurality of graphic elements and is not required to contain vertices; and
wherein colors appearing in said patterned surface are not required to be excluded from appearance in said target image.

19. A kit for separating layers in an image using image processing, comprising:
a surface having a non-repeating pattern printed or embedded thereon, said non-repeating pattern comprising a plurality of graphic elements, having a different chroma and luma; and
a computer readable medium comprising computer executable instructions adapted to:
identify said non-repeating pattern depicted in a captured image;
define a transformation between an original version of said non-repeating pattern stored in a memory and said non-repeating pattern depicted in said captured image; and
remove said non-repeating pattern from said captured image by using said transformation, to be replaced by a target image;
wherein the non-repeating pattern is a multi-chromatic pattern formed by the different chroma and luma of the plurality of graphic elements and is not required to contain vertices; and
wherein colors appearing in said patterned surface are not required to be excluded from appearance in said target image.

20. The method of claim 1, wherein said non-repeating pattern is projected on a surface and have temporal changes.

21. The method of claim 1, wherein each randomly selected sub-area of said patterned surface having an area of between 0.1% and 1% of the area of the patterned surface, is uniquely identifiable by graphic elements depicted in the sub-area.

* * * * *